US011216203B2

(12) United States Patent
Padala et al.

(10) Patent No.: US 11,216,203 B2
(45) Date of Patent: Jan. 4, 2022

(54) METHOD AND REALLOCATION COMPONENT FOR MANAGING REALLOCATION OF INFORMATION FROM SOURCE TO TARGET MEMORY SLED

(71) Applicant: Telefonaktiebolaget LM Ericsson (publ), Stockholm (SE)

(72) Inventors: Chakri Padala, Bangalore (IN); Ganapathy Raman Madanagopal, Bengaluru (IN); Daniel Turull, Solna (SE); Vinay Yadhav, Upplands Väsby (SE); Joao Monteiro Soares, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/651,353

(22) PCT Filed: Sep. 27, 2017

(86) PCT No.: PCT/SE2017/050937
§ 371 (c)(1),
(2) Date: Mar. 27, 2020

(87) PCT Pub. No.: WO2019/066689
PCT Pub. Date: Apr. 4, 2019

(65) Prior Publication Data
US 2020/0272350 A1  Aug. 27, 2020

(51) Int. Cl.
*G06F 12/00* (2006.01)
*G06F 13/00* (2006.01)
*G06F 3/06* (2006.01)

(52) U.S. Cl.
CPC .......... *G06F 3/0647* (2013.01); *G06F 3/0619* (2013.01); *G06F 3/0631* (2013.01);
(Continued)

(58) Field of Classification Search
CPC .... G06F 3/0647; G06F 3/0619; G06F 3/0631; G06F 3/0632; G06F 3/0659; G06F 3/0683
(Continued)

(56) References Cited

U.S. PATENT DOCUMENTS 5,680,582 A * 10/1997 Slayden ................ G06F 12/023
711/171
2006/0224844 A1  10/2006 Kano et al.
(Continued)

FOREIGN PATENT DOCUMENTS

EP        2437167 A1    4/2012
WO   2008/055269 A2    5/2008
(Continued)

OTHER PUBLICATIONS

"CPU/Memory Board Replacement and Dynamic Reconfiguration (DR)," 2004, 23 pages, Sun Fire Entry-Level Midrange System Administration Guide, Chapter 10, available online at https://docs.oracle.com/cd/E19095-01/sfe2900.srvr/817-5233-10/removal.html.
(Continued)

*Primary Examiner* — Sheng Jen Tsai
(74) *Attorney, Agent, or Firm* — NDWE LLP

(57) ABSTRACT

A method and a reallocation component for managing a reallocation of information from a source memory sled to a target memory sled. The source and target memory sleds comprise a respective table indicating source status for each page of the source and target memory sleds, respectively. The reallocation component initiates, for each respective source page whose status indicates that the respective source page is initialized, reallocation of the respective content allocated on each respective source page of the source memory sled to a respective target page of the target memory sled. The reallocation component sets for each
(Continued)

respective source page whose status indicates that the respective source page is uninitialized, the respective target status for the respective target page to indicate uninitialized, while refraining from reallocating the respective content allocated on each respective source page whose status indicates that the respective source page is uninitialized.

9 Claims, 6 Drawing Sheets

(52) U.S. Cl.
CPC .......... *G06F 3/0632* (2013.01); *G06F 3/0659* (2013.01); *G06F 3/0683* (2013.01)

(58) Field of Classification Search
USPC ........................................................ 711/154
See application file for complete search history.

(56) References Cited

U.S. PATENT DOCUMENTS

| | | | | |
|---|---|---|---|---|
| 2007/0288718 | A1* | 12/2007 | Cholleti | G06F 12/1009 711/170 |
| 2010/0262727 | A1* | 10/2010 | Arndt | G06F 13/28 710/22 |
| 2011/0060885 | A1* | 3/2011 | Satoyama | G06F 3/067 711/170 |
| 2011/0145528 | A1* | 6/2011 | Watanabe | G06F 3/0605 711/162 |
| 2011/0185139 | A1* | 7/2011 | Inoue | G06F 3/0644 711/165 |
| 2011/0197044 | A1* | 8/2011 | Sudo | G06F 3/0685 711/165 |
| 2011/0264868 | A1* | 10/2011 | Takata | G06F 3/0631 711/154 |
| 2011/0289296 | A1* | 11/2011 | Saito | G06F 3/0647 711/209 |
| 2011/0302577 | A1* | 12/2011 | Reuther | G06F 9/45558 718/1 |
| 2012/0005435 | A1* | 1/2012 | Emaru | G06F 3/0644 711/154 |
| 2012/0011315 | A1* | 1/2012 | Ishizaki | G06F 3/0665 711/114 |
| 2012/0096231 | A1* | 4/2012 | Morishita | G06F 3/0611 711/162 |
| 2012/0254583 | A1* | 10/2012 | Serizawa | G06F 3/0608 711/206 |
| 2012/0296867 | A1* | 11/2012 | Berkvens-Matthijsse | G06F 16/178 707/610 |
| 2013/0138908 | A1* | 5/2013 | Iwasaki | G06F 3/067 711/165 |
| 2013/0212345 | A1* | 8/2013 | Nakajima | G06F 3/0605 711/161 |
| 2013/0275802 | A1* | 10/2013 | Endo | G06F 11/1076 714/6.23 |
| 2014/0196037 | A1 | 7/2014 | Gopalan | |
| 2014/0351545 | A1* | 11/2014 | Nakajima | G06F 3/067 711/170 |
| 2015/0253991 | A1* | 9/2015 | Nikaido | G06F 3/0689 711/114 |
| 2015/0324139 | A1* | 11/2015 | Inoue | G06F 3/0689 711/165 |
| 2016/0026489 | A1 | 1/2016 | Maislos et al. | |
| 2016/0026984 | A1* | 1/2016 | Sagano | G06F 3/0608 705/40 |
| 2016/0124668 | A1* | 5/2016 | Inbar | G06F 12/0246 711/162 |
| 2017/0090964 | A1* | 3/2017 | Tsirkin | G06F 9/45558 |
| 2017/0177222 | A1 | 6/2017 | Singh et al. | |
| 2017/0308321 | A1* | 10/2017 | Kumagai | G06F 3/0649 |

FOREIGN PATENT DOCUMENTS

| | | |
|---|---|---|
| WO | 2012/009843 A1 | 1/2012 |
| WO | 2013/095559 A1 | 6/2013 |
| WO | 2018/004956 A1 | 1/2018 |

OTHER PUBLICATIONS

International Preliminary Report on Patentability, PCT App. No. PCT/SE2017/050937, dated Apr. 9, 2020, 8 pages.
International Search Report and Written Opinion, PCT App. No. PCT/SE2017/050937, dated Jul. 11, 2018, 12 pages.
Supplementary European Search Report and Search Opinion, EP App. No. 17927159.8, dated Dec. 2, 2020, 9 pages.

\* cited by examiner

METHOD AND REALLOCATION COMPONENT FOR MANAGING REALLOCATION OF INFORMATION FROM SOURCE TO TARGET MEMORY SLED

CROSS-REFERENCE TO RELATED APPLICATIONS

This application is a National stage of International Application No. PCT/SE2017/050937, filed Sep. 27, 2017, which is hereby incorporated by reference.

TECHNICAL FIELD

Embodiments herein relate to computer systems, such as cloud computing systems, data centers, computer halls, hardware systems or the like. In particular, a method and a reallocation component for managing a reallocation of information from a source memory sled to a target memory sled are disclosed. A corresponding computer program and a computer program carrier are also disclosed.

BACKGROUND

Computer systems are formed by hardware and software architectures. Hardware architectures deal with how different resources, such as processing power, memory, networking interface and the like, are interconnected to, e.g. in terms of physical formats, number of wires, each other. Software architectures deal with how different programs, such as operating systems, applications, applets, virtual machines and more, are executed on the hardware architecture.

Traditional hardware architectures, used for e.g. a data center, a cloud computing system, are typically built up by a plurality of racks, such as cabinets, that are networked together. Each rack comprises one or more fully functional computers, e.g. embodied as one or more server blades. Hence, each server blade is self-contained with resources, such as processors, memory, storage units, networking interface and Input/Output (I/O) peripherals. An issue with a server blade is its static nature with regard to composition of resources. This implies that once the server blade has been assembled, processing capacity, memory capacity, network interface capacity etc. cannot be upgraded without physical intervention with the server blade, e.g. memory capacity could be upgraded by manually inserting more memory into the server blade.

In order to solve this issue, and other issues, disaggregated hardware architectures have emerged. A disaggregated hardware architecture, such as Intel Rack Scale architecture and HyperScale Datacenter Systems, separates the resources—which with the traditional hardware architecture would have been confined within one blade—that make up a hardware machine, such a server computer. The separated resources are typically organized into e.g. blades where each blade mainly includes only one of processors, memories, networking interfaces and the like. Then, a host machine can be allocated by selecting resources from one or more blades. In some cases, the disaggregated hardware system may comprise a mixture of conventional self-contained blades and blades mainly including only one of processors, memories, networking interfaces and the like.

An exemplifying known disaggregated hardware system 1 is shown in FIG. 1. The known disaggregated hardware system 1 comprises an interconnect 2, such as a superfast optical fiber connectivity. The interconnect 2 interconnects a Central Processing Unit (CPU) rack 3, a memory rack 4 and a storage rack 5. The memory rack 4 may refer to short-term memories, such as cache memory or the like, whereas the storage rack 5 may refer to long-term storage, such as hard drives, magnetic tape, etc. Here, long-term and short-term shall be considered in relation to each other. Typically, each rack comprises one or more blades. With this set up, e.g. the CPU rack 3 and the storage rack 5 will be available also during replacement of the memory rack 4, while it may be assumed that other memory racks (not shown) may support, at least during the replacement, any need of memory that the CPU rack 3 and the storage rack 5 may have. The CPU rack 3 comprises CPUs, the memory rack 4 comprises memory units, and the storage rack 5 comprises disk units, all shown as rectangles in their respective rack. A Host Machine Manager 6 handles assignment of resources, such as CPU, memory and storage, to host machines. In this example, three host machines 10, 20 and 30 and their respective resources are illustrated in the Figure.

Hence, unlike the traditional hardware architectures, where memory is very tightly coupled to one or more processors on the same sled, or in the same casing, the disaggregated hardware architecture provides a capability for an application, such as a host machine, a virtual machine, container or the like, to have portion of its memory in another sled. Such portion of memory is herein referred to as remote memory. The remote memory is connected to the processor using the fast interconnect. In contrast to the remote memory, the application has some further portion of its memory on the same sled as one or more processors, which executes the application. Such further portion of memory is herein referred to as local memory. In this manner, the application is allowed to scale up by attaching more remote memories to the application when needed.

In the known disaggregated hardware systems, an application is executing on a current server, such as a virtual server, or physical server using remote memory. A number of memory sleds are allocated to the current server. Hence, the memory sleds of the current server will be used by the application during execution thereof.

In a first example, the memory sleds may need to be replaced or removed. In order not to cause failure and/or interruption to the application, the memory sleds shall not be used by the application during replacement or removal. A problem may thus be how to ensure that the memory sleds are not used at replacement or removal.

In a second example, it may be observed that the application may use better suited, e.g. higher/lower latency etc., memory sleds. Another problem may thus be how to enable adjustment of memory sleds used by the application.

In order to solve these problems, the application can be moved to a different server according to known manners, such as so called live migration of application. The different server shall at least not be allocated with those memory sleds that are to be removed or replaced. Furthermore, it can be that the different server shall be allocated with some desired memory sleds that are considered to be better suited. (Hence, by a move of the application the memory sleds used by the application are adjusted.)

Disadvantageously, such a move of the application from the current server to the different server requires that the application is shut-down, or at least temporarily paused.

A problem may thus be how to provide adjustment of memory sleds used by an application without, or with only minor, interruption of the execution of the application.

SUMMARY

An object may to overcome, or at least alleviate, the above mentioned problem.

According to an aspect, the object is achieved by a method, performed by a reallocation component, for managing a reallocation of information from a source memory sled to a target memory sled. The information is used by an application executing in a compute sled. The information comprises a respective content allocated on a respective source page of the source memory sled. The source memory sled comprises a source table indicating a respective source status for each said respective source page. The respective source status indicates that said respective source page is at least one of initialized and uninitialized. The target memory sled comprises a target table indicating a respective target status for each respective target page of target pages of the target memory sled. The information is to be reallocated to said target pages of the target memory sled.

The reallocation component initiates, for said each respective source page whose status indicates that said respective source page is initialized, reallocation of the respective content allocated on said each respective source page of the source memory sled to a respective target page of the target memory sled. Moreover, the reallocation component sets, for said each respective source page whose status indicates that said respective source page is uninitialized, the respective target status for the respective target page to indicate uninitialized, while refraining from reallocating the respective content allocated on said each respective source page whose status indicates that said respective source page is uninitialized.

According to another aspect, the object is achieved by a reallocation component configured for managing a reallocation of information from a source memory sled to a target memory sled. The information is used by an application executing in a compute sled. The information comprises a respective content allocated on a respective source page of the source memory sled. The source memory sled comprises a source table indicating a respective source status for each said respective source page. The respective source status indicates that said respective source page is at least one of initialized and uninitialized. The target memory sled comprises a target table indicating a respective target status for each respective target page of target pages of the target memory sled. The information is to be reallocated to said target pages of the target memory sled.

The reallocation component is configured for initiating reallocation of the respective content allocated on said each respective source page of the source memory sled to a respective target page of the target memory sled for said each respective source page whose status indicates that said respective source page is initialized. Furthermore, the reallocation component is configured for setting the respective target status for the respective target page to indicate uninitialized, while refraining from reallocating the respective content allocated on said each respective source page whose status indicates that said respective source page is uninitialized, for said each respective source page whose status indicates that said respective source page is uninitialized.

According to further aspects, the object is achieved by a computer program and a computer program carrier corresponding to the aspects above.

Thanks to the source table, the reallocation component is able to initiate reallocation of the respective content allocated on said each respective source page whose status is initialized, e.g. used by the application. In this manner, content that is actually associated with, or used by, the application is moved to the target memory sled.

Moreover, thanks to that only the respective content is stored in the source memory sled is moved, less information needs to be moved as compared to with so called live migration in which all information related to the application is moved to a different server, i.e. even information residing locally in a compute sled in which the application may be executing.

Furthermore, the information that is moved according to the embodiments herein is accessed less frequently than any information of the compute sled. Consequently, the information to be moved according to the embodiments herein is less prone to cause interruption. Therefore, the information can be moved without interrupting, or almost without interrupting, execution of the application. This means that the reallocation of the information is transparent to the application, which experiences no delay, or merely a small delay.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
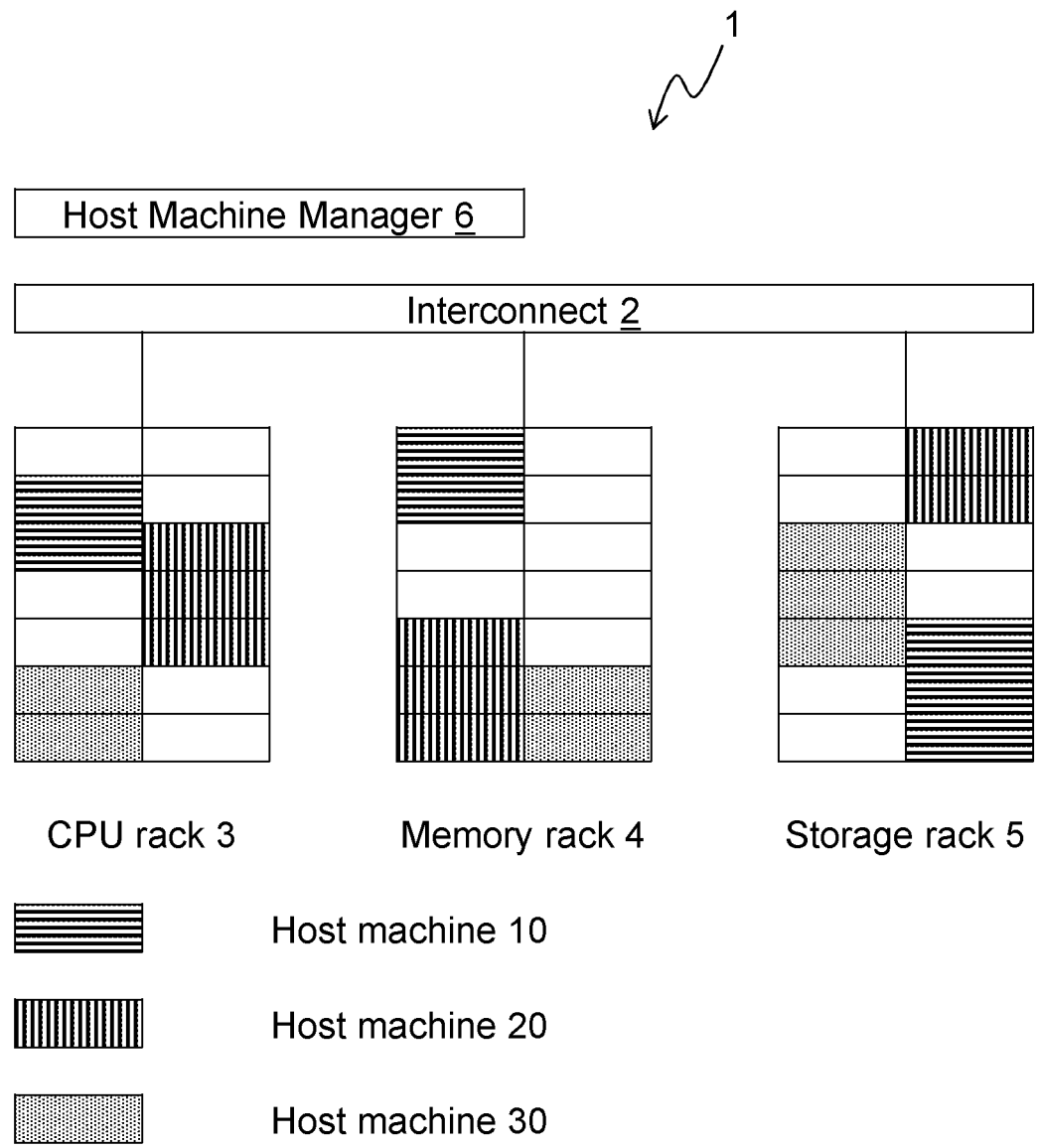
FIG. 1 is a schematic block diagram illustrating a known disaggregated hardware system.

Returning to the disaggregated hardware system mentioned in the background section, it may be noted that resources of such disaggregated hardware system are assigned to host machines. Performance of a system—as a whole—may degrade due to defragmentation of resources. E.g. system performance is degraded in that it may become difficult to assign resources to a host machine while fulfilling requirements concerning e.g. latency for the host machine.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

Figure 2:
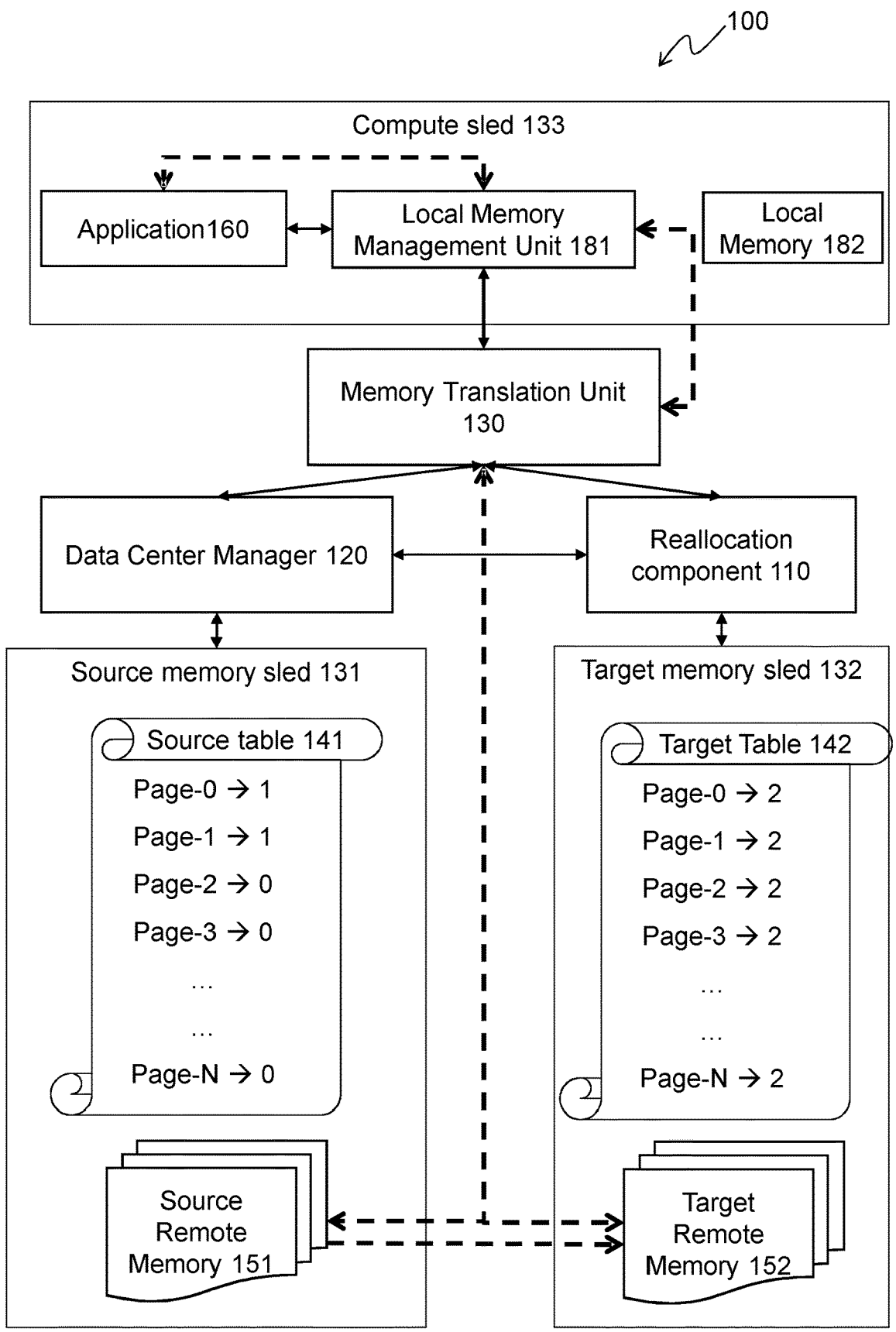
FIG. 2 is a schematic block diagram of an exemplifying hardware system in which embodiments herein may be implemented.

FIG. 2 depicts an exemplifying hardware system 100 in which embodiments herein may be implemented. The hardware system 100 may be a disaggregated hardware system.

Generally, the hardware system 100 relies on a principle of hardware resource disaggregation. The principle of hardware resource disaggregation considers CPU, memory and network resources as individual and modular entities, or resources. The resources are often organized in structures for holding such resources. Each structure may thus mainly hold only one type of resources, i.e. mainly only CPU, memory or another type of resource. As an example, the term "structure" may refer to a rack, a chassis, a blade, a sled, a closet, a cabinet or the like. For simplicity, the term "sled" is used throughout the present disclosure, but the term may be used interchangeably in related literature.

There may for instance be one or more structures for holding CPU units and one or more structures for holding memory units. The resources may also, or alternatively, be organized into many other different kinds of structures for holding resources, such as a structure for holding storage, a structure for holding network interfaces, etc. The terms "CPU structure", "memory structure" etc. will be used herein to refer to a structure for holding CPUs and a structure for holding memory units. When utilizing the hardware system 100, a host machine may be composed of a sub-set of resources within one or more structures.

In this example, the hardware system 100 may comprise, among other things, a reallocation component 110, such as a reallocation apparatus, a reallocation device, a reallocation software module residing on a dedicated or non-dedicated hardware and the like, for managing a reallocation of information from a source memory sled 131 to a target memory sled 132. The information is used by an application 160 executing in a compute sled 133. The hardware system 100 may thus comprise the source memory sled 131, the target memory sled 132 and the compute sled 133.

The application 160 may be a host machine, a virtual machine, a container, an operating system, a computer program or the like.

Moreover, a data center managing module 120 (DCM) may be comprised in the hardware system 100. The data center managing module 120 may perform various tasks relating to managing of the hardware system 100, such as detecting when it may be suitable to reallocate the information related to the application 160, assignment of resources to different applications executing in the hardware system 100, starting and/or stopping of applications and more.

Additionally, the data center managing module 120 may assign, monitor and control remote memory that belongs to the application 160.

When the application 160 needs to retrieve some data from a certain remote memory, such as a source remote memory 151, a target remote memory 152 or the like, a request for said data is sent to a memory translation unit 130. The memory translation unit 130 may e.g. keep track of where to find said data and provide access to said data. The reallocation component 110 or the data center managing module 120 may further configure the memory translation unit 130 to properly access the remote memory.

Moreover, the source memory sled 131 comprises the source remote memory 151 and the target memory sled 132 comprises the target remote memory 152.

The application 160 is associated with the information, or data, stored in a set of source pages of the source remote memory 151 of the source memory sled 131. The data comprises a respective content stored in a respective source page of the source remote memory 151.

The source memory sled 131 may manage a source table 141. The source table 141, i.e. records of the table, indicates the respective source status of each source page. There may be one record for each source page. The respective source status for any source page indicates that said any source page is at least one of initialized and uninitialized.

Similarly, the target memory sled 132 may manage a target table 142. Hence, the target table 142, i.e. records of the table, indicates the respective target status of each target page. There may be one record for each target page. The respective target status for any target page indicates that said any target page is at least one of initialized and uninitialized. The target table 142 may be created during, or just before, reallocation of the information.

These tables may, for example, hold information about remote address, whether the page is used by the application 160 or not, meta-information of the pages in remote memories that belong to the application 160, etc. In particular, the tables may keep track of a status of each page, where the status is one of initialized, uninitialized or unknown. The target table 142 may be initialized, e.g. by the data center managing module 120, the reallocation component 110 or the like, with status unknown for all pages.

The may be one table per application in order to reduce search time in the table, but it is also conceivable that there is one table per sled and each entry of the table includes information about to which application the corresponding page relates. The term "initialized" may refer to that the respective content allocated on said respective page is used by the application.

The term "uninitialized" may refer to that said respective page includes any data that is not related to the application, e.g. no data related to the application.

The term "unknown" may indicate that it may be required to investigate whether or not the remote page need to be reallocated, e.g. the source table 141 may need to be checked to find out whether the page is initialized or uninitialized.

The source and target tables 141, 142 may also be managed, e.g. modified, read, written etc., by the reallocation component 110.

As used herein, the term "stored", "stored", "storing" and the like, may refer to that data and/or content is physically stored in a memory.

As used herein, the term "allocated", "allocate", "allocating" and the like, may refer to that a page is allocated, i.e. is located, in a certain memory, such as a local or remote memory.

As used herein, the term "local", such as local memory, may refer to that the memory is comprised in the same sled as e.g. the application 160 is executing.

As used herein, the term "remote", such as remote memory, may refer to that the memory is comprised in a sled that is different from the sled in which e.g. the application 160 is executing.

A Local Memory Management Unit (LMMU) 181, i.e. for the compute sled 133, may keep track of when pages may need to be retrieved from remote memory, which may reside in e.g. the source memory sled 131 or the like. This may happen when the application 160 requests data/information that is not present in a local memory 182 of the compute sled 133. Furthermore, the LMMU 181 is comprised in the compute sled 133 where the application is running. When the application 160 accesses a virtual address, LMMU 181 fetches the corresponding page from the local memory 182 or from the source remote memory 151. Page access from the local or remote memory is not visible from the perspective of the application and the LMMU 181 provides this abstraction. Hence, the LMMU 181 may translate the virtual addresses used by the application 160 to local physical addresses relating to the local memory 182 or to remote addresses relating to a memory sled, such as the source memory sled 131.

It may here be noted that the respective target page of the target memory sled 132 corresponds to said each respective page of the source memory sled 131 in terms of its identification towards the application 160. Accordingly, a location of the pages in remote memory is transparent to the application 160.

All entities of the hardware system 100 may be interconnected by a fast interconnect, such as an optical fiber interconnect or the like.

The memory translation unit 130 may be located, e.g. with reference to the fast interconnect, between the local memory 182 and the remote memories 151, 152. When the application 160 attempts to access a page, which is allocated to a remote memory, the LMMU 181 forwards the request to the memory translation unit 130. The memory translation unit 130 knows the location of the remote memory and provides access to that page.

In some examples, the attempts to access a page are sent to the remote memory 151, 152 by appropriate configuration of the hardware, e.g. using Virtual Router Redundancy Protocol (VRRP) for Remote Direct Memory Access (RDMA) based remote memory copy or changing the Peripheral Component Interconnect Express (PCIe) bridge configuration so that memory requests are sent to the appropriate memory sled.

Furthermore, dashed arrows in FIG. 2 illustrate data flows, or data paths. The data paths are used when content is reallocated, memory is accessed, memory is modified, etc. Solid arrows illustrate control flows, or control paths. The control paths are used for sending requests, instructions, commands, messages and the like, between entities of the hardware system 100.

In view of the above, it may be noted that the total amount of memory required by the application 160 may be allocated from different memory sleds and the local memory 182, e.g. based on a total amount of memory needed by the application 160, desired performance of the application 160 etc. The remote memory, e.g. residing in a memory sled, is allocated by the data center managing module 120 and the Local Memory Management Unit (LMMU) present in the sled where the application is running. LMMU knows whether the page resides in local memory or in a remote memory.

Figure 3A:
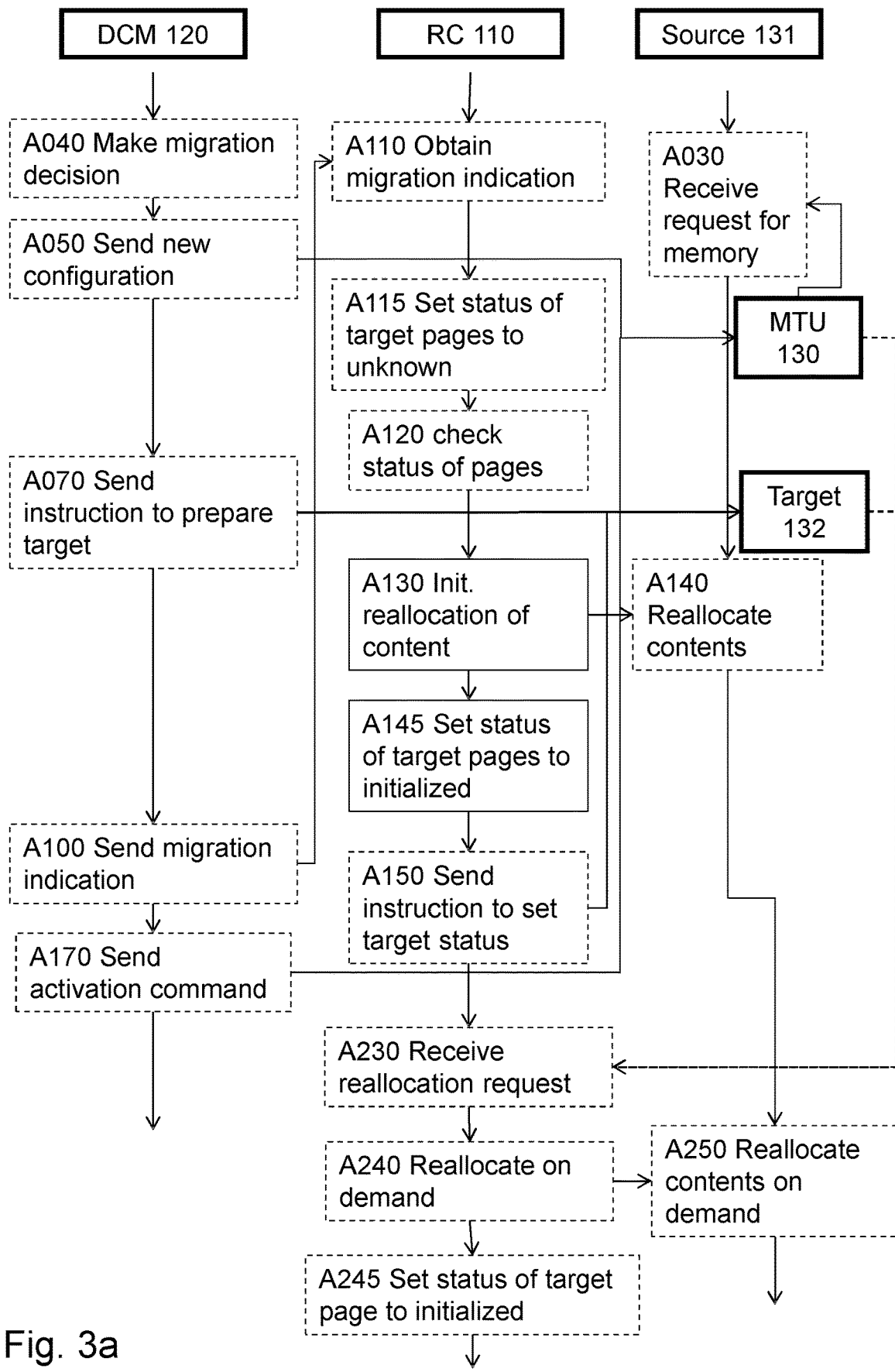
FIGS. 3a and 3b are exemplifying combined signaling and flowcharts illustrating embodiments of the method when implemented in the exemplifying hardware system of FIG. 2.
Figure 3B:
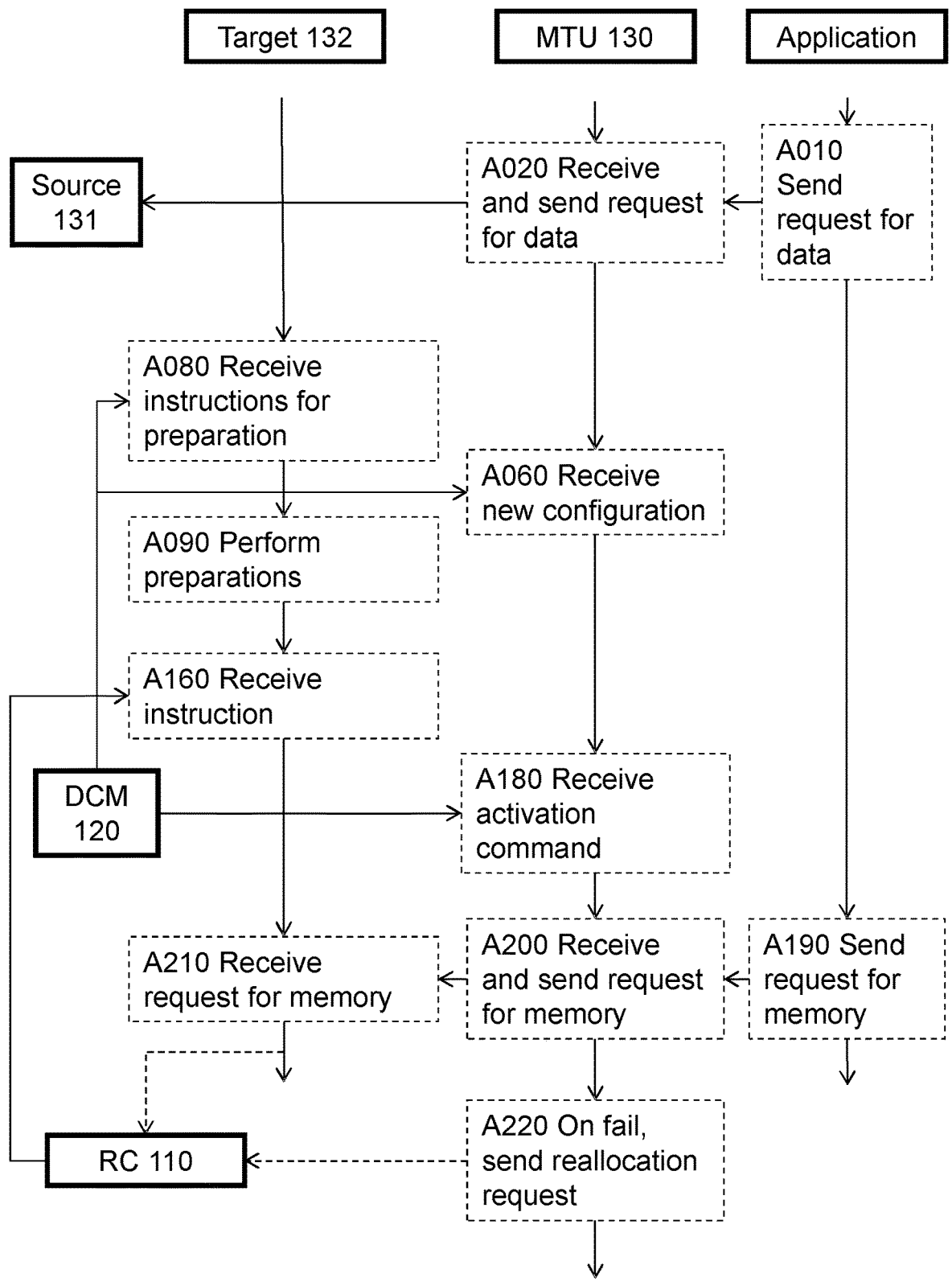

FIG. 3a and FIG. 3b illustrates an exemplifying method according to embodiments herein when implemented in the hardware system 100 of FIG. 1.

The reallocation component 110 performs a method for managing a reallocation of information from the source memory sled 131 to the target memory sled 132.

As mentioned, the information is used by the application 160 executing in the compute sled 133. The information comprises a respective content allocated on a respective source page of the source memory sled 131. The source memory sled 131 comprises a source table 141 indicating a respective source status for each said respective source page. The respective source status indicates that said respective source page is at least one of initialized and uninitialized. The target memory sled 132 comprises a target table 142 indicating a respective target status for each respective target page of target pages of the target memory sled 132. The information is to be reallocated to said target pages of the target memory sled 132.

One or more of the following actions, shown in either FIG. 3a or FIG. 3b, may be performed in any suitable order.

Actions A010 to action A030 describes a general request for data before the information has been reallocated to the target memory sled 132.

Action A010

Starting in FIG. 3b, the application 160 may send a request for data, e.g. a request for content residing on a particular page, to the memory translation unit 130. The request may be sent via the LMMU 181 (not shown), which forwards the request to the memory translation unit 130 when the LMMU 181 finds that the requested content is located in a remote memory, such as the source memory sled 131. The LMMU 181 may sometimes convert, or transform, the request into another format as required by the memory translation unit 130.

In more detail, when the application 160 accesses a certain virtual address, the LMMU 181 fetches the corresponding page either from the local memory or forwards the request to MTU 130 to fetch the page from a remote memory depending on whether the the LMMU 181 has registered that the certain virtual address is associated with local or remote memory. When contents are written into a specific page, the corresponding status of the source table 141 is updated, e.g. set to initialized, for the specific page.

Action A020

Subsequently to action A010, the memory translation unit 130 may receive the request for data. The memory translation unit 130 may forward, with or without modification and/or translation, the request to the source memory sled 131.

Action A030

Continuing in FIG. 3a and subsequently to action A020, the source memory sled 131 may receive the request for data, which thus at least originates from the application 160 depending on whether or not any conversion, or transformation, has been performed by the memory translation unit 130.

Action A040

For various reasons, such as performance of the application 160, maintenance of the source memory sled 131 or the like, the data center managing module 120 may make a migration decision.

Action A050

In order to make the memory translation unit 130 aware of where remote pages shall be stored, shall be accessed, shall be retrieved from, etc., the data center managing module 120 may send a new configuration to the memory translation unit 130.

Action A060

Now in FIG. 3b and subsequently to action A050, the memory translation unit 130 may thus receive the new configuration from the data center managing module 120. When the new configuration is activated, e.g. as in action A180 below, any subsequent requests for content of pages may be forwarded to a memory sled as given by the new configuration.

Sometimes the new configuration may be activated immediately. Then, the new configuration may preferably be sent after the target memory sled 132 has been prepared, e.g. after action A090 and/or action A160.

Action A070

Already returning to FIG. 3a, the data center managing module 120 may send instructions to the target memory sled 132 in order to prepare the target memory sled 132 for reception of the information related to the application 160. Preparation of the target memory sled 132 may include allocation/selection of a physical module, i.e. within the target memory sled 132, where the pages or memory will be allocated.

In the following, notes about which Figure the actions belong are omitted for reasons of simplicity.

Action A080

Subsequently to action A070, the target memory sled 132 may receive the instructions for preparation of the target memory sled 132.

Action A090

Subsequently to action A080, the target memory sled 132 may perform the preparations according to the received instructions.

Action A100

The data center managing module 120 may send, to the reallocation component 110, an indication to initiate reallocation of the information relating to the application 160. The indication may include one or more of: a respective identification of the source and target memory sleds 131,132, a parameter relating to size of memory at target memory sled 132, and the like.

Action A110

Subsequently to action A100, the reallocation component 110 may obtain, such as receive, retrieve, fetch or the like, the indication to commence migration of the information. As an example, the reallocation component 110 receives the indication from the data center managing module 120. As another example, the reallocation component 110 fetches the indication from a memory, which e.g. the data center managing module 120 writes with the indication when appropriate.

Action A115

The reallocation component 110 may initially set status of all target pages of the target memory sled 132 to unknown.

Should a request for particular content on a particular page be received at the target memory sled 132 at this stage, the target memory sled 132 may, as exemplified in action A220 below notify the reallocation component 110, that a reallocation of that particular content to the target memory sled 132 is desired, preferably immediately. This kind of notification may be seen as a kind of high priority reallocation request.

In some examples, action A070 may include that the data center managing module 120 initializes, or triggers initialization of, the target table 142 with status set to unknown for all target pages.

Action A120

In order to make an efficient reallocation of the information of the source memory sled 131, the reallocation component 110 may check status of each source page. The status of said each source page may determine how the reallocation component 110 acts as described in more detail with reference to action A130 and A145.

Action A130

The reallocation component 110 initiates, for said each respective source page whose status indicates that said respective source page is initialized, reallocation of the respective content allocated on said each respective source page of the source memory sled 131 to a respective target page of the target memory sled 132. Thanks to that status is initialized for some source pages, the reallocation component 110 is able to identify source pages whose content is to be reallocated.

As an example, the reallocation component 110 may initiate the reallocation by sending an instruction to the source memory sled 131 to reallocate the respective content, i.e. to move, or send, the respective content to the target memory sled 132.

Moreover, the reallocation component 110 may set status for the corresponding target pages to initialized.

In some examples, each source page may be associated with a respective utility indication relating to at least one of access frequency, time stamp of latest access to said each source page, latency and memory type, wherein a set of utility indications may comprises the respective utility indication for each source page. The respective utility indication thus comprises previous statistics related to the page under consideration, e.g. the source page. For target pages, similar statistics is not yet available, but may of course be provided once the target memory sled 132 has been in use for a while.

With these examples, the reallocation component 110 may perform action A130 by further including at least one of:

selecting a first set of source pages based on the set of utility indications, selecting a second set of source pages based on the set of utility indications, where e.g. the first set of source pages are more frequently accessed than the second set of source pages, and the initiation of the reallocation comprises:

beginning with initiation of reallocation of the first set of source pages, and then continuing, after the first set of source pages has been reallocated, with initiation of reallocation of the second set of source pages.

In this manner, the reallocation component 110 may use previous statistics to prioritize page reallocation from the source memory sled 131 to the target memory sled 132.

Action A140

When the source memory sled 131 has been instructed to initiate reallocation of content, the source memory sled 131 may reallocate the information as instructed.

Action A145

The reallocation component 110 sets, for said each respective source page whose status indicates that said respective source page is uninitialized, the respective target status for the respective target page to indicate uninitialized, while refraining from reallocating the respective content allocated on said each respective source page whose status indicates that said respective source page is uninitialized.

Thanks to that status is uninitialized for some source pages, the reallocation component 110 is able to identify source pages whose content shall not be reallocated.

Action A150

The reallocation component 110 may send, to the target memory sled 132, a further instruction to set status of the target table 142 of the target memory sled 132.

In this manner, the reallocation component 110 populates the target table 142 with status uninitialized for those pages that are not used by the application 160, i.e. those target pages that corresponds to the source pages that are not used.

Action A160

Subsequent to action A150, the target memory sled 132 may receive the instruction from the reallocation component 110. The target table 142 is thus updated accordingly.

It may here be noted that the reallocation component 110 may directly modify the target table 142 or the reallocation component 110 may instruct the target memory sled 132 of how to modify the target table 142.

Action A170

E.g. once the target memory sled 132 has been prepared, the data center managing module 120 may send an activation command to the memory translation unit 130.

The preparation of the target memory sled 132 includes at least that the target table 142 has been initialized with status unknown for all target pages. It may however be preferred that action A130 and action A145 has been completed, or at least partially performed.

Action A180

Subsequent to action A170, the memory translation unit 130 may receive the activation command. The activation command instructs the memory translation unit 130 to use the new configuration when receiving requests. As a result, the memory translation unit 130 will direct requests, as in action A200 below, for content on a page to the target memory sled 132 when the new configuration indicates that the page is allocated in the target memory sled 132.

Action A190

At this stage, the new configuration is activated in the memory translation unit 130. Assume that the application 160 may send a request for memory, i.e. make an attempt to access a certain page, to the memory translation unit 130.
Action A200

Subsequent to action A190, the memory translation unit 130 may then receive the request for memory. The memory translation unit 130 may then check where to find the requested memory, e.g. according to the new configuration, and then send the request for memory to the appropriate memory sled, such as the target memory sled 132.
Action A210

Subsequently to action A200, the target memory sled 132 may receive the request for memory, i.e. a request for content of the certain page.

In case of successful memory request, the target memory sled 132 may then retrieve, e.g. from the target remote memory 152, and provide the requested content of the certain page to the application 160.
Action A220

In case of unsuccessful request, the target memory sled 132 may send, to the reallocation component 110, a reallocation request in order for the content on the requested certain page to be reallocated on demand. This may for example happen when the certain page has status unknown.

In some examples, the target memory sled 132 may indicate unsuccessful retrieval of the content of the certain page to the memory translation unit 130. The memory translation unit 130 may then send the reallocation request to the reallocation component 110 which immediately manages reallocation of content on the certain page to the target memory sled 132.

Action A220 and/or action A240 and/or action A245 may be performed during the initiated reallocation of action A130.
Action A230

Subsequent to action A220, the reallocation component 110 may receive a reallocating request for reallocation of the respective content of a source page yet to be allocated to a target page, wherein status of the source pages is initialized and status of the target page is unknown.
Action A240

The reallocation component 110 may reallocate the respective content allocated on each respective source page of the source memory sled 131 to a respective target page of the target memory sled 132, wherein status of the respective source page of the source memory sled 131 is initialized.
Action A245

The reallocation component 110 may set the respective target status for the respective target page to indicate initialized.

Since the memory translation unit 130 may be configured to fetch the content of the certain page before the reallocation of the entire information may have been finalized, it may be that the application 160, at least indirectly, accesses both the source memory sled 131 and the target memory sled 132 during the reallocation of the information.
Action A250

Similarly to action A130, the source memory sled 131 may reallocate contents on demand.

Once all the information from the source memory sled 131 has been reallocated to the target memory sled 132, the reallocation component 110 may inform (not shown) the data center managing module 120 about that the reallocation has been completed.

The data center managing module 120 may then disassociate the source remote memory 151 with respect to the application 160 and reset, or delete, the source table 141.

The embodiments herein show how to transfer the information related to the application 160, the information residing in the source memory sled 131, to the target memory sled 132, i.e. a newly configured memory.

After the data center managing module 120 allocates and sets up new memory, e.g. the target memory sled 132, the reallocation component 110 may use the source table 141 to efficiently copy the information from the source memory sled 131 to the target memory sled 132, i.e. from the source remote memory 151 to the target remote memory 152. According to some embodiments, it may be that—at the same time, or partially the same time, as the reallocation occurs, all the new requests, from the application 160, for memory are sent to the target memory sled 132. The target memory sled 132 is able to fetch data from the source memory sled 131 and provide the page if that page is not available in the target memory sled 132.

It may here be mentioned that the reallocation of the information related to the application 160 is thus performed without performing a so called live migration of the application 160.

In this manner, it is completely transparent to the application 160 in which remote memory, such as in which memory sled, the contents of a certain page is stored. Therefore, the application 160 may continue to execute as if no reallocation is performed. The application 160 will in most cases not have a degraded performance during the reallocation of the information. However, in some cases, the application 160 may experience a small delay, e.g. due to a page fault caused by that a requested page was not yet reallocated. The small delay may thus be caused be the so called on demand reallocation. Advantageously, the reallocation component 110 performs a seamless reallocation of the information related to the application 160, where seamless refers to that the reallocation may be performed without the application's 160 knowledge, i.e. without informing or interrupting the application 160.

Furthermore, e.g. maintenance personnel—taking care of the hardware system 100—may be able to put a certain sled, such as the source memory sled 131, out of operation e.g. for maintenance purposes without losing any data stored in the certain memory sled.

Additionally, it may be beneficial from the application's 160 point of view, e.g. in terms of latency, energy efficiency, amount of memory used, etc., to reallocate the information from the source memory sled 131 to the target memory sled 132.

Figure 4:
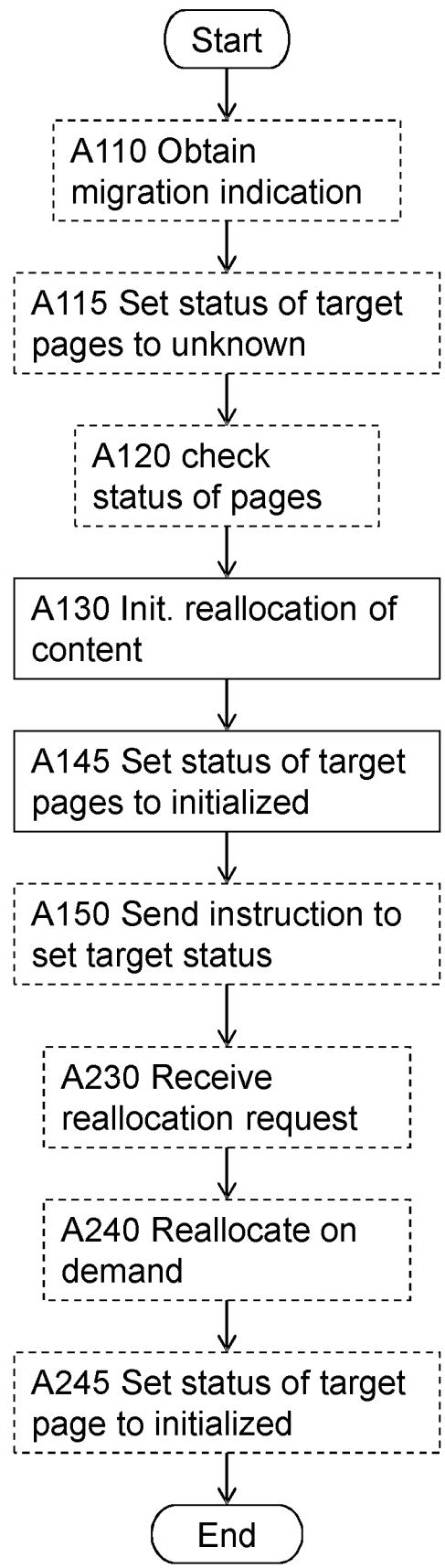
FIG. 4 is an exemplifying flowchart illustrating embodiments of the method in the reallocation component.

In FIG. 4, a schematic flowchart of exemplifying methods in the reallocation component 110 is shown. Again, the same reference numerals as above have been used to denote the same or similar features, in particular the same reference numerals have been used to denote the same or similar actions. Accordingly, the reallocation component 110 performs a method for managing a reallocation of information from the source memory sled 131 to the target memory sled 132.

As mentioned, the information is used by the application 160 executing in the compute sled 133. The information comprises a respective content allocated on a respective source page of the source memory sled 131. The source memory sled 131 comprises a source table 141 indicating a respective source status for each said respective source page. The respective source status indicates that said respective source page is at least one of initialized and uninitialized. The target memory sled 132 comprises a target table 142 indicating a respective target status for each respective target page of target pages of the target memory sled 132. The information is to be reallocated to said target pages of the target memory sled 132.

One or more of the following actions may be performed in any suitable order.

Action A110

The reallocation component 110 may obtain an indication to commence migration of the information.

Action A115

The reallocation component 110 may initially set status of all target pages of the target memory sled 132 to unknown.

Action A120

In order to make an efficient reallocation of the information of the source memory sled 131, the reallocation component 110 may check status of each source page. The status of said each source page may determine how the reallocation component 110 acts as described in more detail with reference to action A130 and A145.

Action A130

The reallocation component 110 initiates A130, for said each respective source page whose status indicates that said respective source page is initialized, reallocation of the respective content allocated on said each respective source page of the source memory sled 131 to a respective target page of the target memory sled 132.

Action A145

The reallocation component 110, sets A145, for said each respective source page whose status indicates that said respective source page is uninitialized, the respective target status for the respective target page to indicate uninitialized, while refraining from reallocating the respective content allocated on said each respective source page whose status indicates that said respective source page is uninitialized.

Action A150

The reallocation component 110 may send, to the target memory sled 132, a further instruction to set status of the target table 142 of the target memory sled 132. In this manner, the reallocation component 110 populates the target table 142 with status uninitialized for those pages that are not used by the application 160, i.e. those target pages that corresponds to the source pages that are not used.

During the initiated reallocation A130, action A220 and/or action A240 and/or action A245 may be performed.

Action A230

The reallocation component 110 may receive a reallocating request for reallocation of the respective content of a source page yet to be allocated to a target page, wherein status of the source pages is initialized and status of the target page is unknown.

Action A240

The reallocation component 110 may reallocate the respective content allocated on each respective source page of the source memory sled 131 to a respective target page of the target memory sled 132, wherein status of the respective source page of the source memory sled 131 is initialized. This this fashion, so called on demand reallocation is performed.

Action A245

The reallocation component 110 may set the respective target status for the respective target page to indicate initialized.

Figure 5:
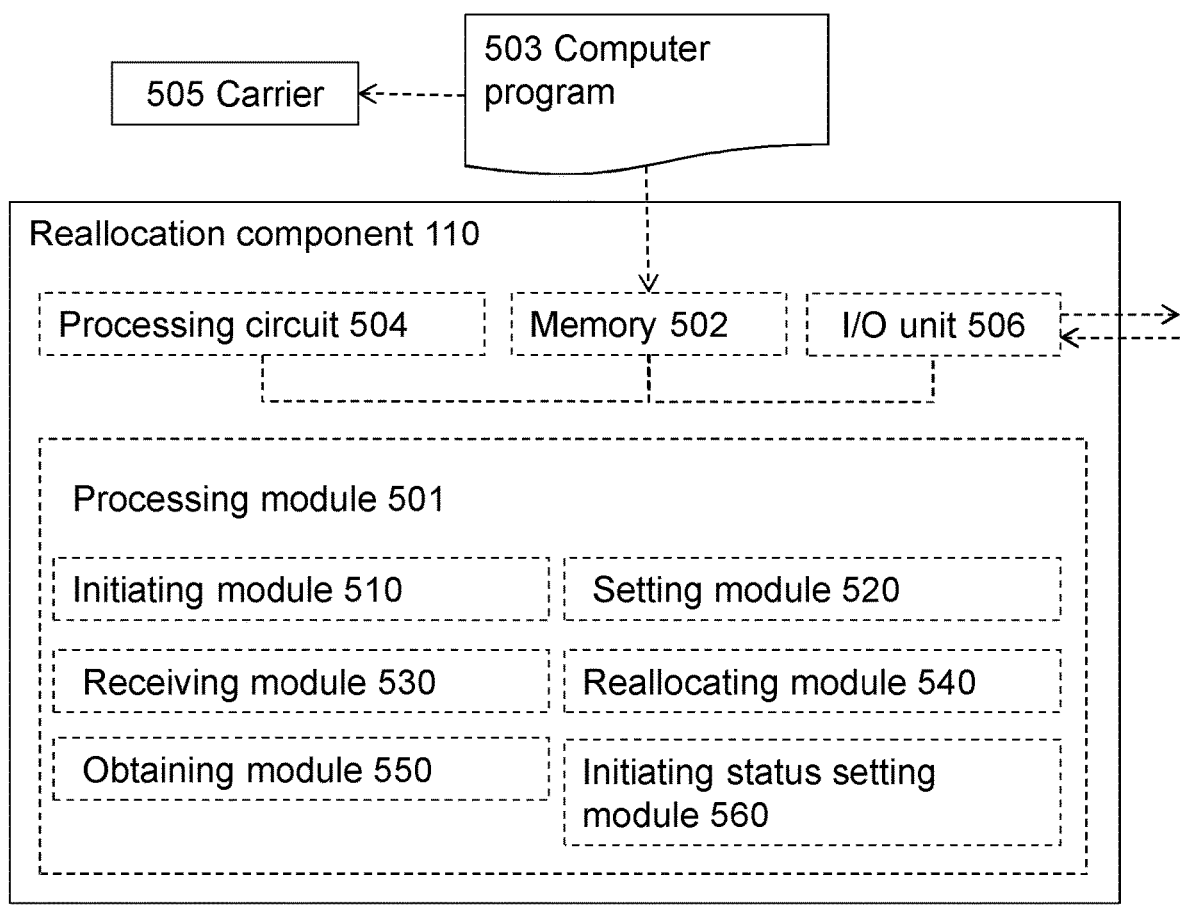
FIG. 5 is a block diagram illustrating embodiments of the reallocation component.

With reference to FIG. 5, a schematic block diagram of embodiments of the reallocation component 110 of FIG. 1 is shown.

The reallocation component 110 may comprise a processing module 501, such as a means for performing the methods described herein. The means may be embodied in the form of one or more hardware modules and/or one or more software modules The reallocation component 110 may further comprise a memory 502. The memory may comprise, such as contain or store, instructions, e.g. in the form of a computer program 503, which may comprise computer readable code units.

According to some embodiments herein, the reallocation component 110 and/or the processing module 501 comprises a processing circuit 504 as an exemplifying hardware module. Accordingly, the processing module 501 may be embodied in the form of, or 'realized by', the processing circuit 504. The instructions may be executable by the processing circuit 504, whereby the reallocation component 110 is operative to perform the methods of FIGS. 3a and 3b and/or FIG. 4. As another example, the instructions, when executed by the reallocation component 110 and/or the processing circuit 504, may cause the reallocation component 110 to perform the method according to FIGS. 3a and 3b and/or FIG. 4.

In view of the above, in one example, there is provided a reallocation component 110 for managing a reallocation of information from a source memory sled 131 to a target memory sled 132. As mentioned, the information is used by an application executing in a compute sled 133. The information comprises a respective content allocated on a respective source page of the source memory sled 131. The source memory sled 131 comprises a source table 141 indicating a respective source status for each said respective source page. The respective source status indicates that said respective source page is at least one of initialized and uninitialized. The target memory sled 132 comprises a target table 142 indicating a respective target status for each respective target page of target pages of the target memory sled 132. The information is to be reallocated to said target pages of the target memory sled 132. Again, the memory 502 contains the instructions executable by said processing circuit 504 whereby the reallocation component 110 is operative for:

for said each respective source page whose status indicates that said respective source page is initialized, initiating reallocation of the respective content allocated on said each respective source page of the source memory sled 131 to a respective target page of the target memory sled 132, and for said each respective source page whose status indicates that said respective source page is uninitialized, setting the respective target status for the respective target page to indicate uninitialized, while refraining from reallocating the respective content allocated on said each respective source page whose status indicates that said respective source page is uninitialized.

FIG. 5 further illustrates a carrier 505, or program carrier, which comprises the computer program 503 as described directly above. The carrier 505 may be one of an electronic signal, an optical signal, a radio signal and a computer readable medium.

In further embodiments, the reallocation component 110 and/or the processing module 501 may comprise one or more of an initiating module 510, a setting module 520, a receiving module 530, a reallocating module 540, an obtaining module 550, and an initiating status setting module 560 as exemplifying hardware modules. In other examples, one or more of the aforementioned exemplifying hardware modules may be implemented as one or more software modules.

Moreover, the reallocation component 110 and/or the processing module 501 comprises an Input/Output unit 506, which may be exemplified by the receiving module and/or a sending module when applicable.

Accordingly, the reallocation component 110 is configured for managing a reallocation of information from a source memory sled 131 to a target memory sled 132.

As mentioned, the information is used by an application executing in a compute sled 133. The information comprises a respective content allocated on a respective source page of the source memory sled 131. The source memory sled 131 comprises a source table 141 indicating a respective source status for each said respective source page. The respective source status indicates that said respective source page is at least one of initialized and uninitialized. The target memory sled 132 comprises a target table 142 indicating a respective target status for each respective target page of target pages of the target memory sled 132. The information is to be reallocated to said target pages of the target memory sled 132.

Therefore, according to the various embodiments described above, the reallocation component 110 and/or the processing module 501 and/or the initiating module 510 is configured for initiating reallocation of the respective content allocated on said each respective source page of the source memory sled 131 to a respective target page of the target memory sled 132 for said each respective source page whose status indicates that said respective source page is initialized.

Furthermore, the reallocation component 110 and/or the processing module 501 and/or the setting module 520 is configured for setting the respective target status for the respective target page to indicate uninitialized, while refraining from reallocating the respective content allocated on said each respective source page whose status indicates that said respective source page is uninitialized, for said each respective source page whose status indicates that said respective source page is uninitialized.

In some embodiments, the reallocation component 110 and/or the processing module 501 and/or the receiving module 530 may be configured for receiving, during the initiated reallocation, a reallocating request for reallocation of the respective content of a source page yet to be allocated to a target page, wherein status of the source pages is initialized and status of the target page is unknown.

Moreover, in these embodiments, the reallocation component 110 and/or the processing module 501 and/or the reallocating module 540 may be configured for reallocating, during the initiated reallocation, the respective content allocated on each respective source page of the source memory sled 131 to a respective target page of the target memory sled 132, wherein status of the respective source page of the source memory sled 131 is initialized.

Additionally, in these embodiments, the reallocation component 110 and/or the processing module 501 and/or the setting module 520, or a further setting module (not shown), may be configured for setting, during the initiated reallocation, the respective target status for the respective target page to indicate initialized.

Furthermore, the reallocation component 110 and/or the processing module 501 and/or the obtaining module 550 may be configured for obtaining an indication to commence migration of the information.

In some embodiments, the reallocation component 110 and/or the processing module 501 and/or the initiating status setting module 560 may be configured for initially setting status of all target pages of the target memory sled 132 to unknown.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on cloud system, which may comprise a set of server machines.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the terms "first", "second", "third" etc. may have been used merely to distinguish features, apparatuses, elements, units, or the like from one another unless otherwise evident from the context.

As used herein, the term "subsequent action" may refer to that one action is performed after a preceding action, while additional actions may or may not be performed before said one action, but after the preceding action.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a reallocation component, for managing a reallocation of information from a source memory sled to a target memory sled, wherein the information is used by an application executing in a compute sled, wherein the information comprises a respective content allocated on a respective source page of the source memory sled, wherein the source memory sled comprises a source table indicating a respective source status for each said respective source page, wherein the respective source status indicates that said respective source page is being used by the application or not used by the application, wherein the target memory sled comprises a target table indicating a respective target status for each respective target page of target pages of the target memory sled, wherein the information is to be reallocated to said target pages of the target memory sled, the method comprises:

obtaining an indication to initiate reallocation of the information relating to the application;
for said each respective source page whose status indicates that said respective source page is used by the application, initiating reallocation of the respective content allocated on said each respective source page of the source memory sled to a respective target page of the target memory sled by:
selecting a first set of source pages based on a set of utility indications comprising access frequency, time stamp of latest access to said each source page, latency and memory type; and
beginning with initiation of reallocation of the first set of source pages, and continuing, after the first set of source pages has been reallocated, with initiation of reallocation of a second set of source pages selected based on the set of utility indications, wherein the first set of source pages is more frequently accessed than the second set of source pages; and
for said each respective source page whose status indicates that said respective source page is not used by the application, setting the respective target status for the respective target page to indicate as not used by the application, while refraining from reallocating the respective content allocated on said each respective source page whose status indicates that said respective source page is not used by the application.

2. The method according to claim 1, wherein the method further comprises, during the initiated reallocation:
receiving a reallocating request for reallocation of the respective content of a source page yet to be allocated to a target page, wherein status of the source page is indicated as used by the application and status of the target page is indicated as yet to be determined;
reallocating the respective content allocated on each respective source page of the source memory sled to a respective target page of the target memory sled, wherein status of the respective source page of the source memory sled is indicated as used by the application; and
setting the respective target status for the respective target page to indicate as used by the application.

3. The method according to claim 1, wherein the method further comprises initially setting status of all target pages of the target memory sled to indicate as yet to be determined.

4. A non-transitory machine-readable storage medium comprising instructions which, when executed on a processing circuit of a reallocation component for managing a reallocation of information from a source memory sled to a target memory sled, wherein the information is used by an application executing in a compute sled, wherein the information comprises a respective content allocated on a respective source page of the source memory sled, wherein the source memory sled comprises a source table indicating a respective source status for each said respective source page, wherein the respective source status indicates that said respective source page is being used by the application or not used by the application, wherein the target memory sled comprises a target table indicating a respective target status for each respective target page of target pages of the target memory sled, wherein the information is to be reallocated to said target pages of the target memory sled, are capable of causing the reallocation component to perform operations comprising:

obtaining an indication to initiate reallocation of the information relating to the application;
for said each respective source page whose status indicates that said respective source page is used by the application, initiating reallocation of the respective content allocated on said each respective source page of the source memory sled to a respective target page of the target memory sled by:

selecting a first set of source pages based on a set of utility indications comprising access frequency, time stamp of latest access to said each source page, latency and memory type; and beginning with initiation of reallocation of the first set of source pages, and continuing, after the first set of source pages has been reallocated, with initiation of reallocation of a second set of source pages selected based on the set of utility indications, wherein the first set of source pages is more frequently accessed than the second set of source pages; and for said each respective source page whose status indicates that said respective source page is not used by the application, setting the respective target status for the respective target page to indicate as not used by the application, while refraining from reallocating the respective content allocated on said each respective source page whose status indicates that said respective source page is not used by the application.

5. A reallocation component configured for managing a reallocation of information from a source memory sled to a target memory sled, wherein the information is used by an application executing in a compute sled, wherein the information comprises a respective content allocated on a respective source page of the source memory sled, wherein the source memory sled comprises a source table indicating a respective source status for each said respective source page, wherein the respective source status indicates that said respective source page is being used by the application or not used by the application, wherein the target memory sled comprises a target table indicating a respective target status for each respective target page of target pages of the target memory sled, wherein the information is to be reallocated to said target pages of the target memory sled, wherein the reallocation component comprising:

a processing circuit; and a memory containing instructions which, when executed by the processing circuit, cause the reallocation component to perform operations to:

obtain an indication to initiate reallocation of the information relating to the application;

for said each respective source page whose status indicates that said respective source page is used by the application, initiate reallocation of the respective content allocated on said each respective source page of the source memory sled to a respective target page of the target memory sled by performing operations to:

select a first set of source pages based on a set of utility indications comprising access frequency, time stamp of latest access to said each source page, latency and memory type; and begin with initiation of reallocation of the first set of source pages, and continue, after the first set of source pages has been reallocated, with initiation of reallocation of a second set of source pages selected based on the set of utility indications, wherein the first set of source pages is more frequently accessed than the second set of source pages; and for said each respective source page whose status indicates that said respective source page is not used by the application, set the respective target status for the respective target page to indicate as not used by the application, while refraining from reallocating the respective content allocated on said each respective source page whose status indicates that said respective source page is not used by the application.

6. The reallocation component according to claim 5, wherein the reallocation component is further configured to:

receive, during the initiated reallocation, a reallocating request for reallocation of the respective content of a source page yet to be allocated to a target page, wherein status of the source page is indicated as used by the application and status of the target page is indicated as yet to be determined;

reallocate, during the initiated reallocation, the respective content allocated on each respective source page of the source memory sled to a respective target page of the target memory sled, wherein status of the respective source page of the source memory sled is indicated as used by the application; and set, during the initiated reallocation, the respective target status for the respective target page to indicate as used by the application.

7. The reallocation component according to claim 5, wherein the reallocation component is further configured to initially set status of all target pages of the target memory sled to indicate as yet to be determined.

8. The non-transitory machine-readable storage medium according to claim 4, wherein the instructions further perform operations during the initiated reallocation comprising:

receiving a reallocating request for reallocation of the respective content of a source page yet to be allocated to a target page, wherein status of the source page is indicated as used by the application and status of the target page is indicated as yet to be determined;

reallocating the respective content allocated on each respective source page of the source memory sled to a respective target page of the target memory sled, wherein status of the respective source page of the source memory sled is indicated as used by the application; and setting the respective target status for the respective target page to indicate as used by the application.

9. The non-transitory machine-readable storage medium according to claim 4, wherein the instructions further perform operations comprising initially setting status of all target pages of the target memory sled to indicate as yet to be determined.

* * * * *